(12) United States Patent
Mangen et al.

(10) Patent No.: US 9,265,194 B2
(45) Date of Patent: Feb. 23, 2016

(54) AGRICULTURAL SPRAYER WITH DEDICATED STORAGE AREA FOR AGRICULTURAL CHEMICAL TOTES

(71) Applicant: CNH America LLC, New Holland, PA (US)

(72) Inventors: Lyle P. Mangen, Willmar, MN (US); Aaron R. Tollefsrud, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 221 days.

(21) Appl. No.: 13/796,637

(22) Filed: Mar. 12, 2013

(65) Prior Publication Data

US 2014/0263704 A1 Sep. 18, 2014

(51) Int. Cl.
*A01C 23/00* (2006.01)
*A01M 7/00* (2006.01)

(52) U.S. Cl.
CPC ............ *A01C 23/008* (2013.01); *A01M 7/0042* (2013.01); *A01M 7/0082* (2013.01); *A01M 7/0092* (2013.01)

(58) Field of Classification Search
CPC .... B05B 9/007; B05B 1/3026; B05B 9/0403; B05B 1/20; B05B 12/00; B05B 12/126; B05B 15/061; B05B 1/04; B05B 11/3057; B05B 13/00; B05B 13/005; B05B 15/066; B05B 15/069; B05B 1/14; B05B 9/01; B05B 9/06; A01M 7/0082; A01M 7/0042; A01M 7/0092; A01M 7/005; A01M 7/00–7/0096; E01H 10/007; E01H 3/02; A01C 21/00; A01C 23/042; A01C 23/008; A01C 23/00–23/047
USPC .................................................. 239/146–176
See application file for complete search history.

(56) References Cited

U.S. PATENT DOCUMENTS

| | | | |
|---|---|---|---|
| 3,385,478 A | 5/1968 | Miller et al. | |
| 3,783,895 A * | 1/1974 | Weichselbaum | ............... 137/588 |
| 3,976,087 A * | 8/1976 | Bolton et al. | ............... 137/15.01 |
| 4,714,196 A * | 12/1987 | McEachern et al. | ............ 239/62 |
| 4,874,023 A * | 10/1989 | Ulm | ............................... 141/346 |
| 5,009,344 A | 4/1991 | Cooley | |
| 5,310,113 A * | 5/1994 | Cowgur | ........................... 239/10 |
| 5,741,090 A * | 4/1998 | Dunning et al. | ............... 405/263 |
| 6,584,919 B2 | 7/2003 | McQuinn | |
| 6,708,631 B1 | 3/2004 | McQuinn et al. | |
| 7,086,342 B2 | 8/2006 | O'Neall et al. | |
| 7,957,850 B2 | 6/2011 | Anderson | |
| 2009/0057258 A1* | 3/2009 | Tornqvist | ....................... 215/247 |

* cited by examiner

*Primary Examiner* — Arthur O Hall
*Assistant Examiner* — Juan C Barrera
(74) *Attorney, Agent, or Firm* — Rebecca L. Henkel

(57) ABSTRACT

An agricultural sprayer for metered application of a liquid includes a chassis, and a carrier tank fixedly mounted to the chassis. The carrier tank is configured for containing a carrier liquid therein. One or more active ingredient tanks are each configured for containing an active ingredient therein. A storage area associated with the chassis is configured for and dedicated to removable storage of each active ingredient tank.

27 Claims, 5 Drawing Sheets

AGRICULTURAL SPRAYER WITH DEDICATED STORAGE AREA FOR AGRICULTURAL CHEMICAL TOTES

BACKGROUND OF THE INVENTION

1. Field of the Invention

The present invention relates to agricultural sprayers, and, more particularly, to such sprayers using a metered application with an onboard primary carrier tank and one or more agricultural chemical tanks.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as a herbicide, fertilizer and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

Agricultural sprayers may generally be divided into two types or methods of application: a batch application method, and a metered application method. With a batch application method, a tank is filled with the carrier liquid, one or more active ingredients are mixed with the carrier liquid in the tank, and the solution or mixture is applied at a predetermined application rate over the field (defined by vehicle travel speed, nozzle size and fluid operating pressure). A batch application method is effective but is not sensitive to different application needs across the field. Moreover, it is rarely the case where liquid in the tank is not left over at the end of spraying, which then must be discarded. These factors increase the operating costs associated with a batch application method.

With a metered application method, the active ingredient(s) are mixed at a metered rate with the carrier liquid as it is transferred from a carrier tank to the sprayer nozzles. Such metering may be carried out using pumps, venturi nozzles or controllable valves. A metered application method allows the application rate to be more easily changed "on-the-fly" across a field, and avoids the need to dispose of unused spray solution at the end of a spray operation (except what may be left in the lines, pump, etc. between the tank and nozzles).

Conventional sprayers using a metered application method include a carrier tank and one or more active ingredient tanks, all of which are permanently mounted to the sprayer chassis. The carrier liquid is pumped from a nurse tank (e.g., carried on a flat truck or trailer) to the carrier tank on the sprayer using a transfer pump and fill lines. Similarly, the active ingredient(s) are pumped from a nurse tank to a respective active ingredient tank on the sprayer using a transfer pump and fill lines. This method of refilling for both the carrier liquid and the active ingredients is effective but is time consuming and requires manual positioning and connection of the fill lines, starting the transfer pumps, etc.

What is needed in the art is an agricultural sprayer with metered application which reduces the downtime and effort associated with refilling the tanks.

SUMMARY OF THE INVENTION

The present invention provides an agricultural sprayer with a dedicated storage area for the removable storage and transport of active ingredient tanks (i.e., agricultural chemical totes) used in metered spraying.

The invention in one form is directed to an agricultural sprayer for metered application of a liquid. The agricultural sprayer includes a chassis, and a carrier tank fixedly mounted to the chassis. The carrier tank is configured for containing a carrier liquid therein. One or more active ingredient tanks are each configured for containing an active ingredient therein. A storage area associated with the chassis is configured for and dedicated to removable storage of each active ingredient tank.

The invention in another form is directed to an agricultural sprayer, including a chassis and a carrier tank fixedly mounted to the chassis. The carrier tank is configured for containing a carrier liquid therein. A support structure fixedly mounted to the chassis has a generally horizontal platform. At least one active ingredient tank is removably positioned on and supported by the horizontal platform.

The invention in yet another form is directed to a method of using an agricultural sprayer, including the steps of: filling a carrier tank fixedly mounted to a chassis with a carrier liquid; placing an active ingredient tank in a dedicated storage area associated with the chassis; connecting the active ingredient tank with a fluid connector associated with the storage area; discharging carrier liquid from the carrier tank; and metering an active ingredient from the active ingredient tank into the carrier liquid.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
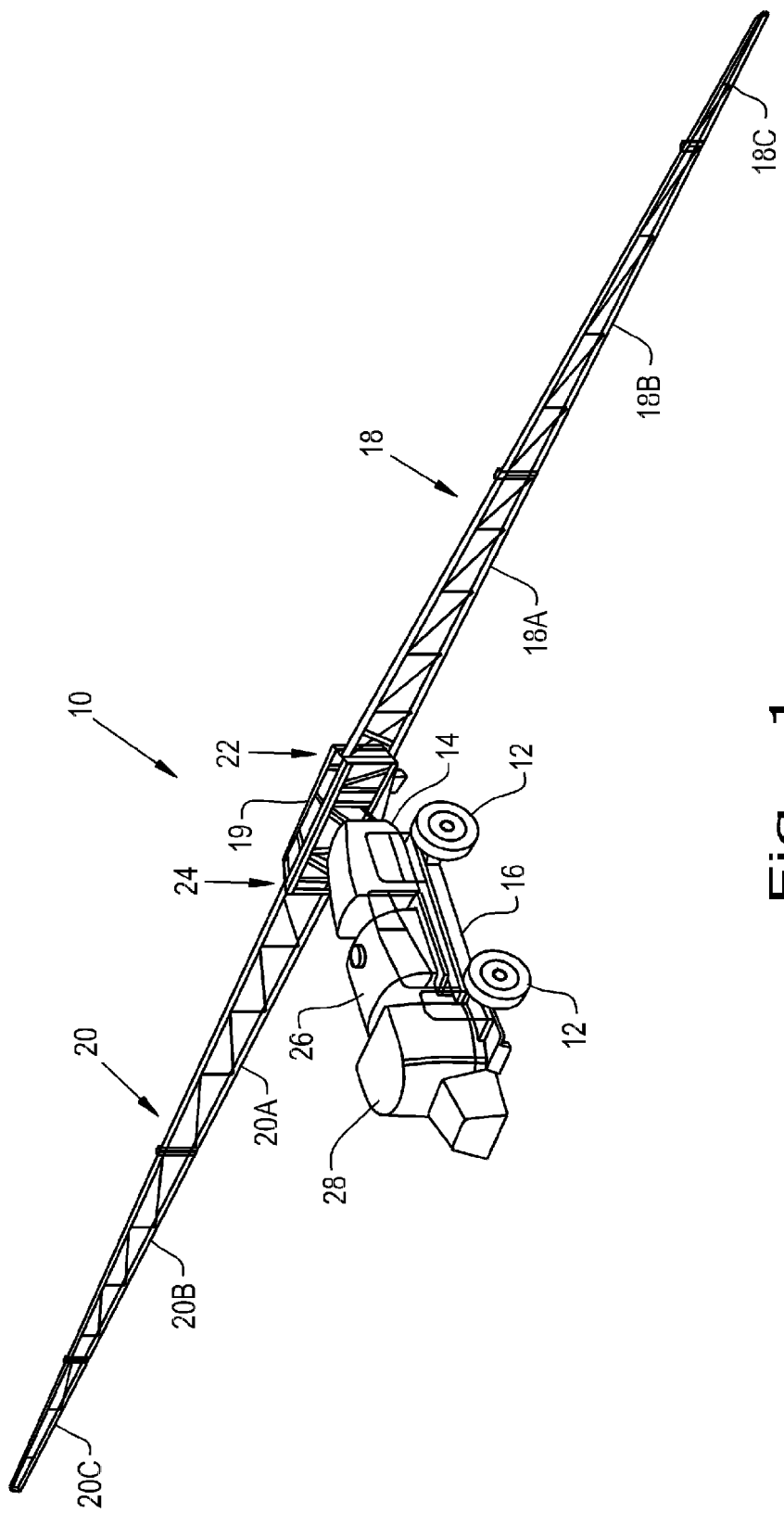
FIG. 1 is a perspective view of an embodiment of an agricultural sprayer of the present invention.

Referring now to the drawings, and more particularly to FIG. 1, there is shown an agricultural sprayer 10 according to one embodiment of the present invention. Agricultural sprayer 10 is shown as a self-propelled sprayer with a plurality of wheels 12 and a prime mover in the form of an internal combustion (IC) engine (e.g., diesel engine) within an engine compartment 14. However, agricultural sprayer 10 could also be configured as a towed sprayer which is towed behind a work vehicle such as a tractor. Moreover, agricultural sprayer could also be a track-type self-propelled vehicle for certain applications.

Agricultural sprayer 10 includes a chassis 16 to which a pair of wing booms 18, 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (not shown). In the embodiment shown, each wing boom has three boom sections, corresponding to the fold locations of the wing boom. In the illustrated embodiment, the spray nozzles of center boom 19 and wing boom sections 18A, 18B, 18C, 20A, 20B and 20C are fluidly connected in parallel relative to each other. Moreover, the spray nozzles within center boom 19 and a same wing boom section 18A, 18B, 18C, 20A, 20B or 20C are typically connected together in series. This arrangement of spray nozzles allows the spray nozzles of center boom 19 and wing boom sections 18A, 18B, 18C, 20A, 20B and 20C to be independently turned on and off as sprayer 10 advances across a field (e.g., using GPS data).

Figure 2:
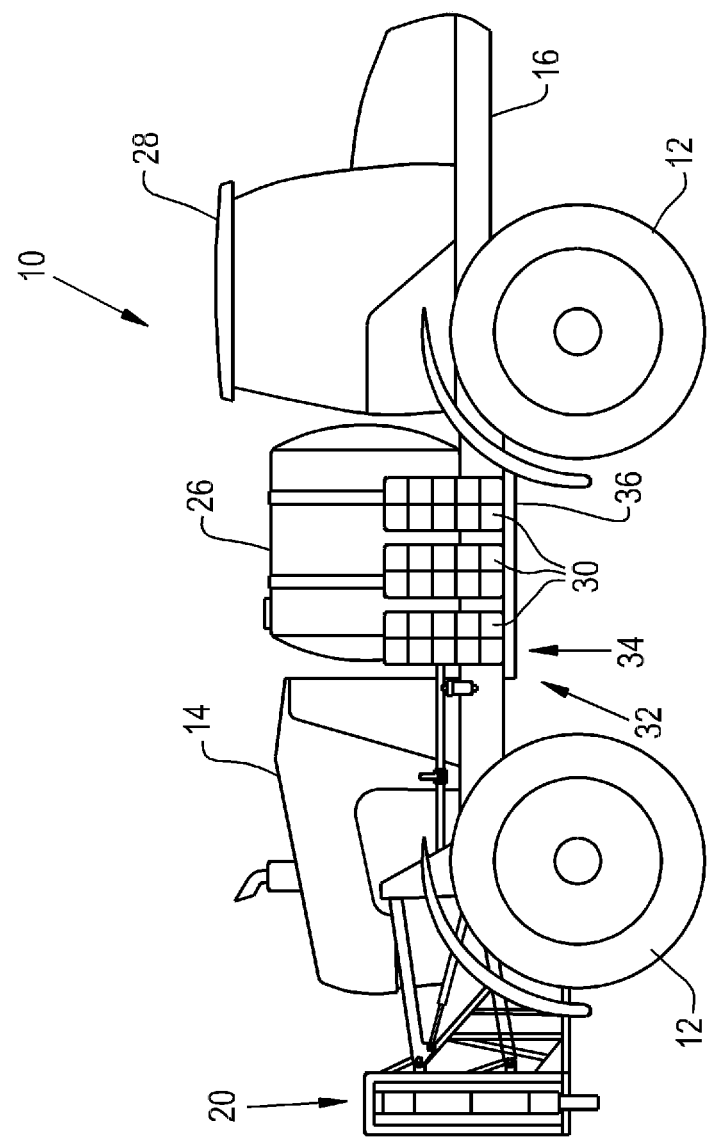
FIG. 2 is a side view of the agricultural sprayer shown in FIG. 1.

Referring now to FIG. 2, a carrier tank 26 is positioned generally in the center of chassis 16 between wing booms 18, 20 and behind an operator cab 28. Carrier tank 26 is designed to contain a carrier fluid, typically water, which is fed to the spray nozzles through a series of fluid lines (not shown). The water is mixed in a metered fashion with one or more active ingredients (i.e., agricultural chemicals such as fertilizer, herbicide or pesticide) stored in respective active ingredient tanks 30 also carried onboard sprayer 10. Metering devices for metering an active ingredient into a carrier liquid from carrier tank 26 are known in the art and not described in greater detail herein. Operator cab 28 contains a control panel (not shown) that has various operator controls for controlling operation of the sprayer and its components.

According to an aspect of the present invention, agricultural sprayer 10 includes a storage area 32 associated with chassis 16 which is configured for and dedicated to removable storage of each active ingredient tank 30. In the illustrated embodiment, storage area 32 includes a support structure 34 which is fixedly mounted to chassis 16. Support structure 34 has a generally horizontal platform 36 for supporting each active ingredient tank 30. Active ingredient tanks 30 are preferably configured as totes, in which case storage area 32 may be defined as a tote storage area.

Each active ingredient tank 30 may have any suitable predefined shape and size. In the embodiment shown, each active ingredient tank 30 has an overall rectangular shape but could have a cube or other exterior shape. Preferably each active ingredient tank 30 has a common predefined shape; however, it is also possible that active ingredient tanks 30 positioned on horizontal platform 36 may have different shapes. For example, one active ingredient tank 30 could have a rectangular shape and another active ingredient tank 30 could have a cube shape. Other predefined shapes such as a cylindrical shape are also possible. Active ingredient tanks 30 are assumed to have a size of between 40 to 50 gallons (corresponding to approximately 400 to 500 pounds each); however, other sizes of active ingredient tanks 30 are also possible. It will be appreciated that support structure 34 must be configured to support any anticipated sizes of active ingredient tanks 30, keeping in mind dynamic loading forces such as fluid sloshing and bouncing as agricultural sprayer 10 proceeds across a field.

Figure 3:
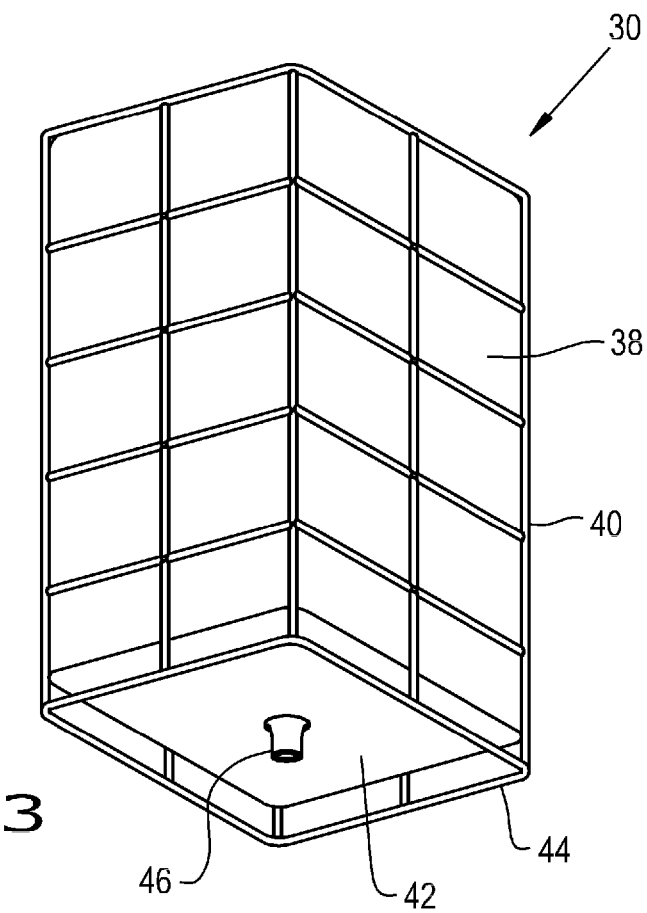
FIG. 3 is a bottom perspective view of an embodiment of an active ingredient tank which may be used with the sprayer shown in FIGS. 1 and 2.
Figure 5:
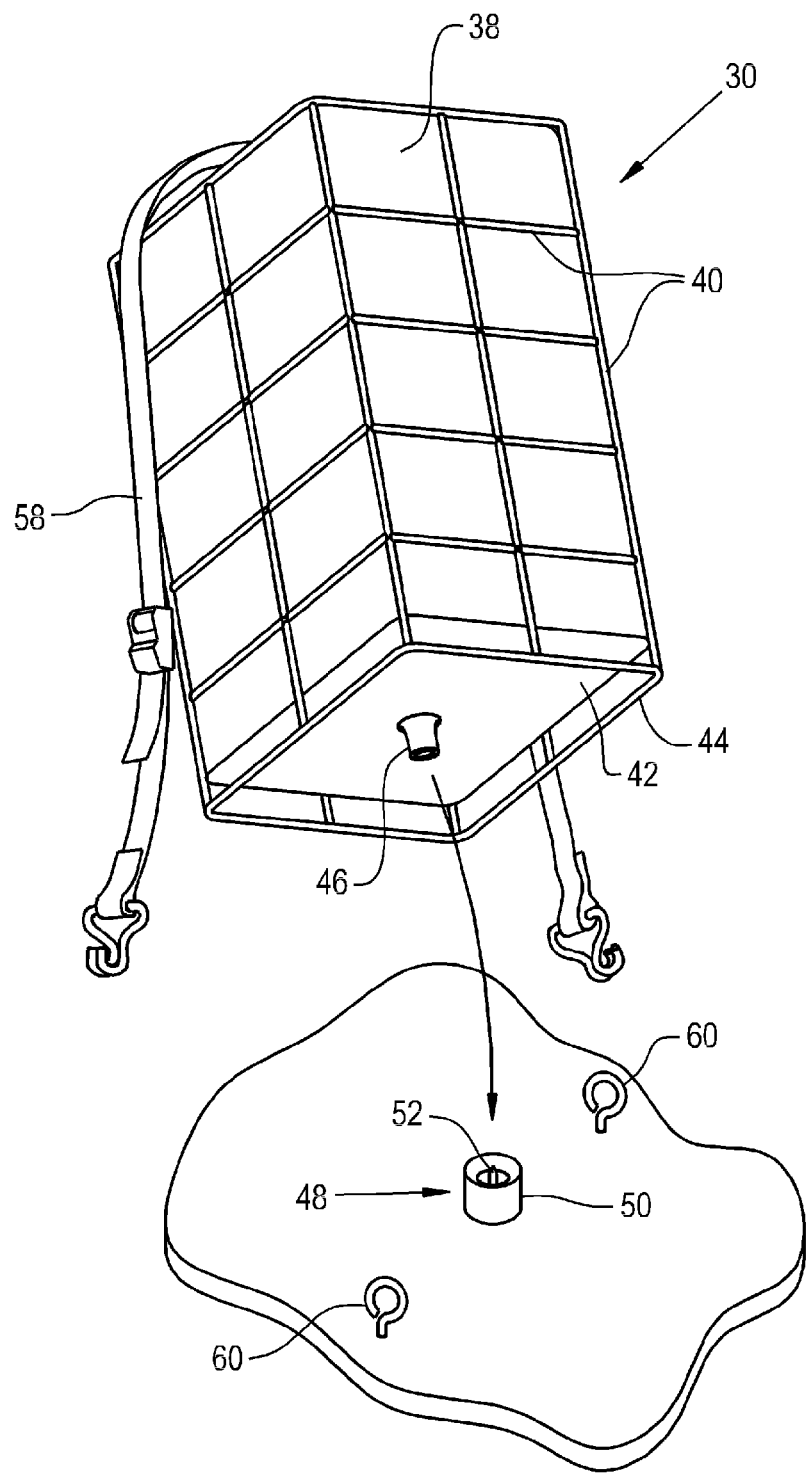
FIG. 5 is a perspective view of an active ingredient tank positioned relative to a fluid connector associated with the tote storage area.

Referring now to FIGS. 3 and 5, and as described above, each active ingredient tank 30 is preferably configured as a tote with a plastic tank 38 surrounded by a metal support structure 40. A bottom wall 42 is spaced upwardly from a bottom edge 44 of active ingredient tank 30 and supports the bottom of tank 38. Active ingredient tank 30 has a downwardly extending nozzle 46 which extends through bottom wall 42 and terminates slightly above bottom edge 44. Nozzle 46 may have any suitable shape and size, and is shown as a tapered nozzle in the illustrated embodiment.

Figure 4:
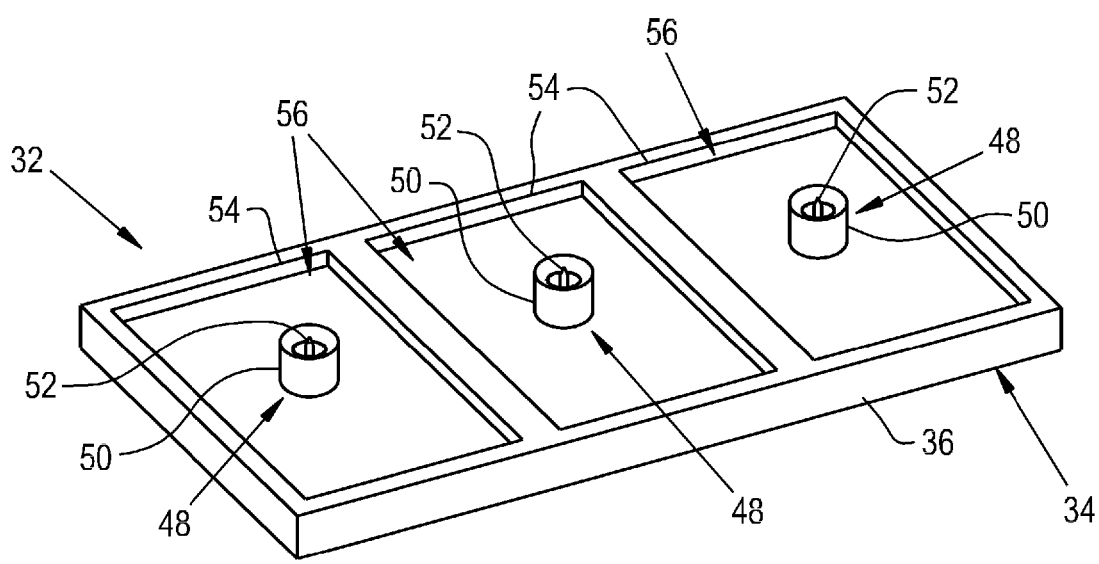
FIG. 4 is a fragmentary, top perspective view of the tote storage area on the sprayer of FIGS. 1 and 2, with the active ingredient tanks removed.

Referring now to FIGS. 4 and 5, storage area 32 includes one or more fluid connectors 48 associated therewith. Each fluid connector 48 is configured for automatically forming a sealed connection with a corresponding active ingredient tank 30 upon placement of active ingredient tank 30 within storage area 32. In the illustrated embodiment, storage area 32 includes three fluid connectors 48 associated with the three respective active ingredient tanks 30.

Each fluid connector 48 is generally configured to pierce and seal with a corresponding active ingredient tank 30. More particularly, each fluid connector 48 includes a reservoir 50 which extends upwardly from storage area 32. A piercing member 52 is centrally located within reservoir 50 and has an upper piercing tip (not numbered) for piercing a membrane forming part of nozzle 46. Nozzle 46 has an exterior shape and size which seals with an interior shape and size of reservoir 50, and piercing of the membrane within nozzle 46 allows the active ingredient within active ingredient tank 30 to flow through fluid connector 48 to a downstream metering device (not shown).

In the embodiment shown in the drawings, nozzle 46 is positioned at the bottom of active ingredient tank 30 and automatically couples with fluid connector 48 within storage area 32. However, other types of automatic or manual fluid connector configurations are also possible. For example, nozzle 46 could be positioned at the lower side of active ingredient tank 30 and automatically or manually coupled with a fluid connector which is in fluid communication with the metering device.

Storage area 32 may be configured with optional upstanding walls 54 defining a recessed area 56 associated with each respective active ingredient tank 30. Each recessed area 56 is configured to receive a bottom edge 44 of an active ingredient tank 30 therein to reduce or eliminate movement of active ingredient tank 30 on support structure 34. Each active ingredient tank 30 may also be restrained within storage area 32 with one or more restraining devices 58. In the embodiment shown, a single restraining device in the form of a restraining strap 58 wraps around a corresponding active ingredient tank 30 and is attached at either end with an eye hook 60 extending upwardly from support structure 34.

Figure 6:
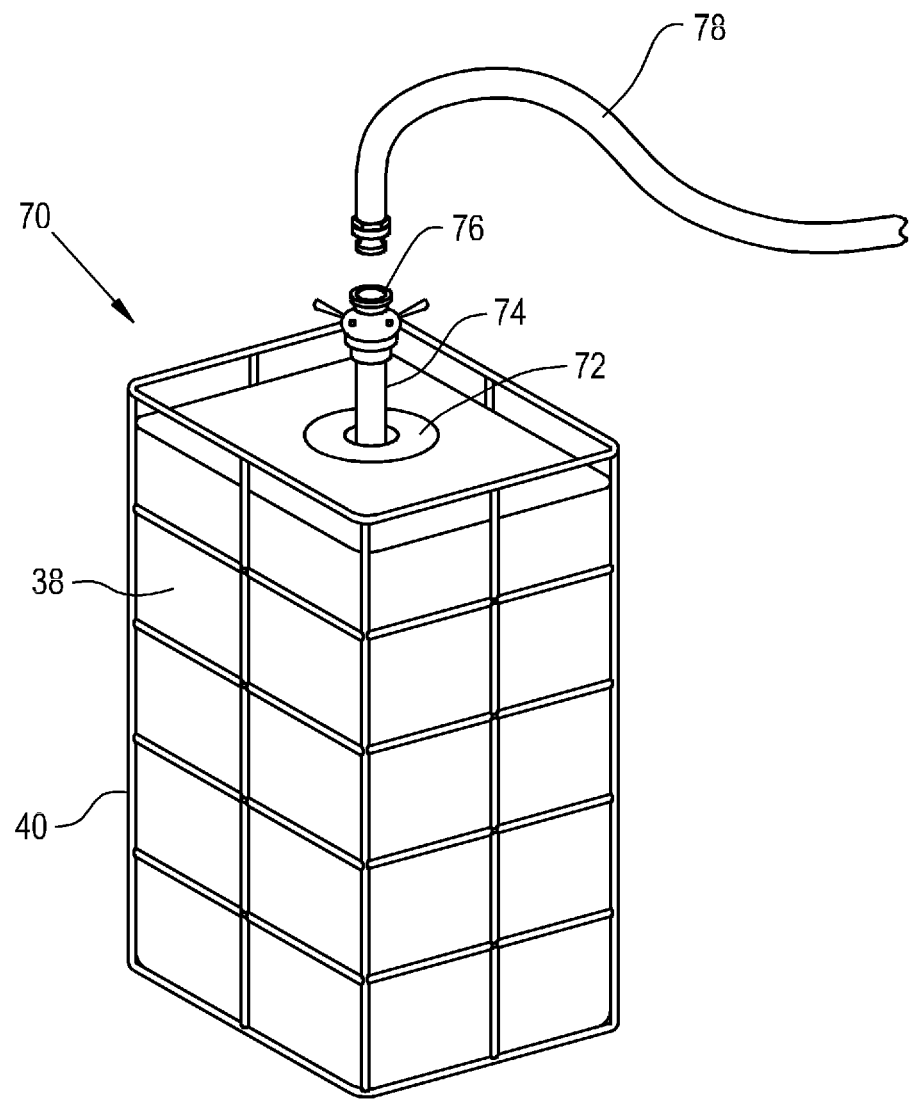
FIG. 6 is a top perspective view of another embodiment of an active ingredient tank which may be used with an agricultural sprayer of the present invention.

Referring now to FIG. 6, there is shown another embodiment of an active ingredient tank 70 which may be used with agricultural sprayer 10 of the present invention. Similar to active ingredient tank 30 described above with reference to FIGS. 2, 3 and 5, active ingredient tank 70 also is configured as a tote with an exterior shape and size which is suitable for a given application. The primary difference between active ingredient tanks 30 and 70 is that active ingredient tank 70 does not have a fluid connector arrangement (e.g., nozzle 46) at the bottom thereof which automatically connects and seals with a mating connector associated with storage area 32. Rather, active ingredient tank 70 includes a top cover 72 with a predefined shape and size which is common from one active ingredient tank 70 to the next. A suction line 74 extends through cover 72 and has a bottom end which is positioned at or near the bottom of active ingredient tank 70. Suction line 74 is preferably configured with a quick-attach fitting 76 for attachment with a corresponding fluid line 78 onboard agricultural sprayer 10 leading to the metering device. In the illustrated embodiment, quick attach fitting 76 is configured as a so-called cam and groove fitting, but could be configured as a different type of quick attach fitting.

During use of agricultural sprayer 10, carrier tank 26 is filled with a carrier liquid such as water. The active ingredient tanks 30 or 70 may be offloaded to the worksite from a delivery vehicle and placed on support structure 34 within storage area 32 of sprayer 10. The active ingredient tanks 30 or 70 are fluidly coupled either automatically or manually as described above, and then strapped down to support structure 34. The metering device receives both the carrier liquid from carrier tank 26, as well as the active ingredients from active ingredient tanks 30 or 70, and meters the active ingredients at known application rates to the agricultural field. When the active ingredient tanks are at or near empty, they may be unstrapped, removed and replaced with another full active ingredient tank 30.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A self-propelled or towed agricultural sprayer for metered application of a liquid, said agricultural sprayer comprising:
   a chassis;
   a carrier tank fixedly mounted to said chassis, said carrier tank being configured for containing a carrier liquid therein;
   at least one wing boom carried by said chassis, said wing boom including a plurality of spray nozzles directed generally downward;
   at least one active ingredient tank, each said active ingredient tank being configured for containing an active ingredient therein;
   a storage area associated with said chassis which is configured for and dedicated to removable storage of each said active ingredient tank; and
   at least one fluid connector associated with said storage area, each said fluid connector fluidly connected to the plurality of spray nozzles and automatically forming a sealed connection with a corresponding said active ingredient tank upon placement of said active ingredient tank within said storage area, each said fluid connector being configured to pierce and seal with a corresponding said active ingredient tank.

2. The agricultural sprayer of claim 1, wherein each said fluid connector includes a reservoir upstanding from said storage area, and a piercing member centrally located within said reservoir.

3. The agricultural sprayer of claim 2, wherein each said active ingredient tank includes a downwardly extending nozzle which is received within said reservoir.

4. The agricultural sprayer of claim 3, wherein said nozzle is a tapered nozzle.

5. The agricultural sprayer of claim 1, wherein each said active ingredient tank has a cover with a common predefined configuration and a suction line extending from said cover into said active ingredient tank.

6. The agricultural sprayer of claim 5, wherein each said cover includes a quick-attach fitting for attachment with a corresponding fluid line onboard said sprayer.

7. The agricultural sprayer of claim 1, further including at least one restraining device, each said restraining device restraining a respective said active ingredient tank within said storage area.

8. The agricultural sprayer of claim 7, wherein each said restraining device comprises a strap.

9. The agricultural sprayer of claim 1, wherein said storage area includes a support structure fixedly mounted to said chassis, said support structure having a generally horizontal platform for supporting each said active ingredient tank.

10. The agricultural sprayer of claim 1, wherein said at least one active ingredient tank comprises a plurality of active ingredient tanks.

11. The agricultural sprayer of claim 1, wherein each said active ingredient tank has a predefined shape and size.

12. The agricultural sprayer of claim 11, wherein said storage area is a tote storage area, and each said active ingredient tank is configured as a tote.

13. A self-propelled or towed agricultural sprayer, including:
   a chassis;
   a carrier tank fixedly mounted to said chassis, said carrier tank being configured for containing a carrier liquid therein;
   at least one wing boom carried by said chassis, said wing boom including a plurality of spray nozzles directed generally downward;
   a support structure fixedly mounted to said chassis, said support structure having a generally horizontal platform;
   at least one active ingredient tank, each said active ingredient tank being removably positioned on and supported by said horizontal platform; and
   at least one fluid connector associated with said horizontal platform, each said fluid connector fluidly connected to the plurality of spray nozzles and automatically forming a sealed connection with a corresponding said active ingredient tank upon placement of said active ingredient tank within said horizontal platform, each said fluid connector being configured to pierce and seal with a corresponding said active ingredient tank.

14. The agricultural sprayer of claim 13, wherein each said fluid connector includes a reservoir upstanding from said horizontal platform, and a piercing member centrally located within said reservoir.

15. The agricultural sprayer of claim 14, wherein each said active ingredient tank includes a downwardly extending nozzle which is received within said reservoir.

16. The agricultural sprayer of claim 15, wherein said nozzle is a tapered nozzle.

17. The agricultural sprayer of claim 13, wherein each said active ingredient tank has a cover with a common predefined configuration and a suction line extending from said cover into said active ingredient tank.

18. The agricultural sprayer of claim 17, wherein each said cover includes a quick-attach fitting for attachment with a corresponding fluid line onboard said sprayer.

19. The agricultural sprayer of claim 13, further including at least one restraining device, each said restraining device restraining a respective said active ingredient tank within said horizontal platform.

20. The agricultural sprayer of claim 19, wherein each said restraining device comprises a strap.

21. The agricultural sprayer of claim 13, wherein said at least one active ingredient tank comprises a plurality of active ingredient tanks.

22. The agricultural sprayer of claim 13, wherein each said active ingredient tank has a predefined shape and size.

23. The agricultural sprayer of claim 22, wherein said horizontal platform is a tote storage area, and each said active ingredient tank is configured as a tote.

24. A method of using a self-propelled or towed agricultural sprayer, said method comprising the steps of:
   filling a carrier tank fixedly mounted to a chassis with a carrier liquid;
   placing an active ingredient tank in a dedicated storage area associated with said chassis;
   connecting said active ingredient tank with a fluid connector associated with said storage area, said fluid connector automatically piercing and sealing with said active ingredient tank upon said placing of said active ingredient tank in said dedicated storage area;
   discharging carrier liquid from the carrier tank;
   metering an active ingredient from said active ingredient tank into the carrier liquid to form a mixed liquid, and
   discharging said mixed liquid directly to an agricultural field through at least one wing boom connected to said chassis, said wing boom including a plurality of spray nozzles directed generally downward.

25. The method of claim 24, wherein each said fluid connector includes a reservoir upstanding from said storage area, and a piercing member centrally located within said reservoir.

26. The method of claim 25, wherein each said active ingredient tank includes a downwardly extending nozzle which is received within said reservoir.

27. The method of claim 24, wherein said active ingredient tank has a cover and a suction line extending from said cover into said active ingredient tank.

* * * * *